April 29, 1941.  J. WILLIAMS  2,239,834
BEARING
Filed Dec. 12, 1939
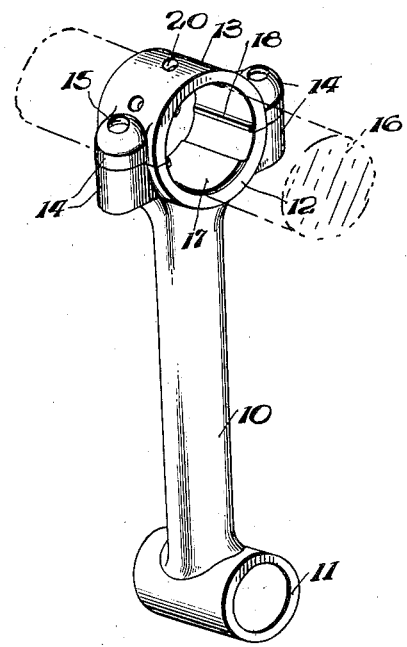
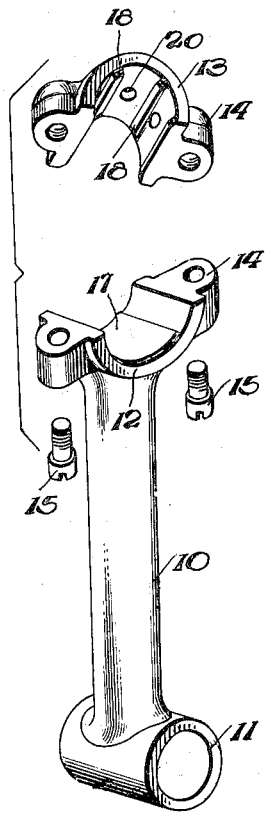
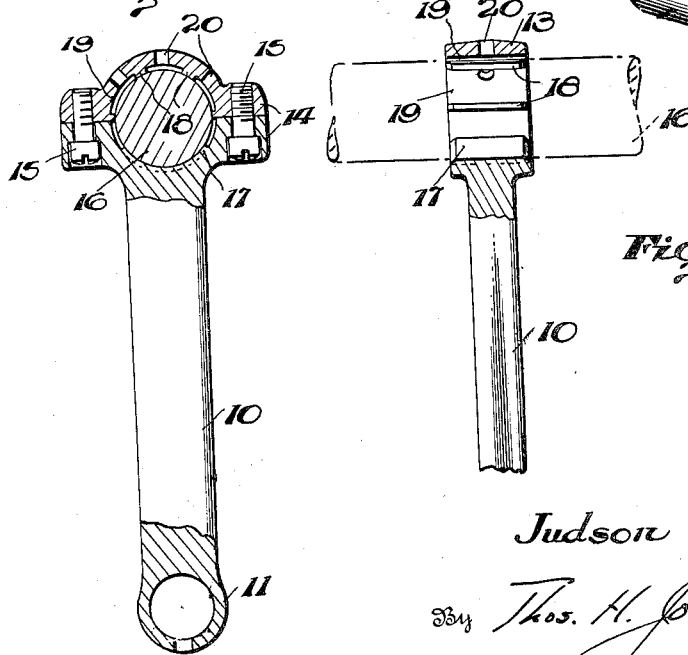
Inventor
Judson Williams.
By Thos. H. Johnston
Attorney Patented Apr. 29, 1941

2,239,834

UNITED STATES PATENT OFFICE 2,239,834

BEARING

Judson Williams, Philadelphia, Pa.

Application December 12, 1939, Serial No. 308,873

5 Claims. (Cl. 308—23)

This invention relates to an improved bearing especially intended for use in conjunction with the connecting rods of two-cycle engines although, however, as will later appear, the bearing is well suited for other adaptations and I do not, therefore, wish to be limited in this respect.

As will be appreciated, the thrust on the connecting rod of a two-cycle engine is, when the engine is in operation, substantially continuous in one direction and, after the engine is started, the bearing cap at the large end of the connecting rod performs very little function. However, it is necessary to provide the cap not only to securely maintain the parts in assembled relation but also to sustain any pulling stress imposed on the rod.

Difficulty is experienced by reason of the fact that, after the engine is started and assumes smooth operation, the fuel gas, as it is drawn through the crank case, expands therein and causes a constant chilling particularly of the large end of the connecting rod, with the result that the bearing at said end of the rod is caused to contract and grab the pin of the crank shaft. The effect is particularly troublesome in small engines such as out-board motors and to overcome the difficulty, the practice conventionally followed is to provide the bearing at the large end of the connecting rod with a very loose fit on the crank pin.

As will be perceived, the over-sized internal circumference of a very loose bearing will have working contact with the smaller circumference of the crank pin only in a very localized area along a straight line between the two with the result that thrust on the connecting rod soon wears the bearing out-of-round internally to interpose even greater looseness between the bearing and pin, which looseness constantly increases with use of the engine.

It is therefore an object of the present invention to provide a bearing which will have substantially a snug working fit with the crank pin while, however, grabbing of the pin by the bearing will be avoided.

A further object of the invention is to provide a bearing wherein contraction of the bearing will be automatically accommodated to obviate grabbing of the pin by the bearing.

Still another object of the invention is to provide a bearing wherein internal centering ribs for the bearing will be provided, and wherein these ribs will be of such reduced area at their points of contact with the pin that, as the bearing contracts, said ribs will crush or flatten to obviate grabbing of the pin by the bearing.

A further object of the invention is to provide a bearing having a journal plate through which the working thrust will be transmitted to the crank pin, wherein said plate will be shaped to fit flat throughout its length against the pin to thus obviate local straight line contact between the plate and pin, wherein the centering ribs provided will be located on the bearing cap to coact with the pin for normally maintaining said plate in contact with the pin, and wherein, due to the greatly reduced area of said ribs at their points of contact with the pin, the ribs will wear as the bearing contracts to thus protect the journal plate and also obviate grabbing of the pin by the bearing.

And the invention seeks, as a still further object, to provide a bearing wherein the centering ribs will be widely spaced apart to thus provide correspondingly wide and unobstructed channels between the pin and cap through which oil may freely circulate to warm the bearing and thus tend to maintain it at an even temperature.

Other and incidental objects of the invention will appear during the course of the following description, and in the drawing:

Figure 1 is a perspective view showing the present invention embodied in the bearing at the large end of the connecting rod of an out-board motor.

Figure 2 is a perspective view showing the bearing cap removed.

Figure 3 is a side elevation, the rod being broken away and the bearing being shown in section.

Figure 4 is a view similar to Figure 3 but at a right angle thereto.

Referring now more particularly to the drawing, I have shown my invention in conjunction with a connecting rod of an out-board two-cycle motor and will describe the structure accordingly. However, I do not wish to be limited in this respect since, as will be appreciated as the description proceeds, the invention is well suited for many other adaptations.

The shank of the connecting rod is indicated at 10 and the usual bearing at the small end of the rod at 11. Formed on the rod at its larger end is an arcuate bearing section 12 and mating therewith is a like section 13. These sections are provided with mating ears 14 and detachably securing the sections together are cap screws or the like 15 coacting with said ears.

The section 12 of the bearing may well be termed the load bearing section. As will be appreciated, the thrust on the connecting rod of a two-cycle engine is, when the engine is in operation, substantially continuous in one direction and, therefore, the thrust load will be transmitted through the bearing section 12 at each stroke of the engine piston. In Figure 3 of the drawing, a crank shaft pin is conventionally shown at 16.

Formed on the bearing section 12 or otherwise fixed thereto at its inner side is a raised medially disposed journal plate 17. As will be observed, this plate terminates short of the ends of the section but occupies the greater portion of the length thereof and extends substantially from edge to edge of the section.

The section 13 provides a cap and formed on said section or otherwise fixed thereto at its inner side are spaced transverse centering ribs 18 extending substantially from edge to edge of the section in parallel relation. Two of these ribs are preferably disposed at the ends of the section and two more equally spaced therebetween and, as will be noted, the ribs are of the same height as the journal plate 17 of the section 12. A less number of ribs may be used or, conversely, a few more and the ribs may be disposed diagonally of the section 13 or otherwise. As will later appear, however, it is important that the ribs be of the fewest number feasible.

As brought out in Figure 3 of the drawing, the journal plate 17 is formed to fit flat throughout its length against the pin 16 and contacts the pin at one side thereof while the ribs 18 contact the pin at its opposite side for centering the bearing on the pin. The plate 17 thus presents a long bearing surface for transmitting the thrust load and said plate in conjunction with the ribs 18 provide a substantially snug working fit for the bearing about the pin. Thus, excessive looseness as is practiced in connection with the bearings of conventional rods, as heretofore pointed out, is eliminated while also, straight line contact between the bearing and pin is avoided.

It is now to be observed that the combined area of the edges of the ribs 18 in contact with the pin 16 is much less than the area of the plate 17, say a fourth or possibly a fifth, and for such reason only a few ribs are preferably used. Accordingly, as the bearing contracts, the ribs will, being the weakest parts in contacts with the pin, be crushed by the pin to thus automatically accommodate such contraction of the bearing and avoid grabbing of the pin by the bearing. Furthermore, as the reciprocation of the connecting rod continues, the ribs will then undergo sufficient wear to provide operating clearance for the contracted bearing while, at the same time, the journal plate 17 will be protected by being held flat against the pin by the ribs so that localized wear on the plate to render it out-of-round will be avoided. As will be understood, the plate 17 and ribs 18 may be of the same metal as the bearing sections or of any special alloy preferred for wearing qualities.

Defined between the ribs 18 are oil channels 19 and formed through the bearing section 13 to communicate with said channels are oil passages 20. Thus, oil will be freely admitted to the pin 16. However, the main purpose of the channels 19 is not to provide for lubrication of the pin especially but to accommodate a free circulation of a large volume of oil through said channels for warming the bearing and as only a few of the ribs 18 are employed, the channels are correspondingly wide to facilitate the objective sought. As will be understood, oil in an engine crank case quickly becomes heated after the engine is started and this warm oil circulating through said channels will tend to maintain the bearing at an even temperature and overcome contraction of the bearing.

In the present instance, I have shown the journal plate 17 and ribs 18 integral with the bearing sections. As will be appreciated, however, said plate and ribs may be carried by a sleeve, lining or bushing inserted in a bearing or formed within the bearing and it is accordingly to be understood that such variations fall within the spirit and scope of the present invention.

Having thus described my invention, I claim:

1. A bearing for the connecting rod of an engine developing a thrust load in a single direction on the rod and including a portion having a journal surface of substantially less than 180° and shaped to a working fit with a revolving element, said surface being disposed on that portion of the rod fashioned to receive said load, and a portion having a part thereon to coact with said portion for normally maintaining said surface element in working engagement with said element but of attenuated mass incapable of sustaining the thrust load and presenting only frail area in working contact with said element to be mutilated thereby as the bearing shrinks and avoid grabbing of said element by the bearing when chilled.

2. A bearing having a portion provided with a journal surface of substantially less than 180° and shaped to a working fit with a revolving element to receive the thrust load, and a portion having means thereon to coact with said element for normally maintaining said surface in working engagement with said element but of attenuated mass incapable of sustaining the thrust load and presenting only frail area in working contact with said element to be mutilated thereby as the bearing shrinks and avoid grabbing of said element by the bearing when chilled.

3. A bearing having a portion provided with a journal surface of substantially less than 180° and shaped to a working fit with a revolving element to receive the thrust load, and a portion having a rib thereon to coact with said element for normally maintaining said surface in working engagement with said element but of attenuated mass incapable of sustaining the thrust load and presenting only frail area in working contact with said element to be mutilated thereby as the bearing shrinks and avoid grabbing of said element by the bearing when chilled.

4. A sectional bearing having a section provided with a journal surface of substantially less than 180° and shaped to a working fit with a revolving element to receive the thrust load, and a mating section having a rib rising therefrom to coact with said element for normally maintaining said surface in working engagement with said element but of attenuated mass incapable of sustaining the thrust load and presenting only frail area in working contact with said element to be mutilated thereby as the bearing shrinks and avoid grabbing of said element by the bearing when chilled.

5. A sectional bearing having a section provided with a raised circumferential journal surface of substantially less than 180° and shaped to a working fit with a revolving element to receive the thrust load, and a mating section having spaced transverse ribs rising from the inner face thereof to coact with said element for normally maintaining said surface in working engagement with said element but respectively of attenuated mass incapable of sustaining the thrust load and together presenting only an aggregate frail area in working contact with said element to be mutilated thereby as the bearing shrinks and avoid grabbing of said element by the bearing when chilled.

JUDSON WILLIAMS.